Patented Aug. 9, 1949

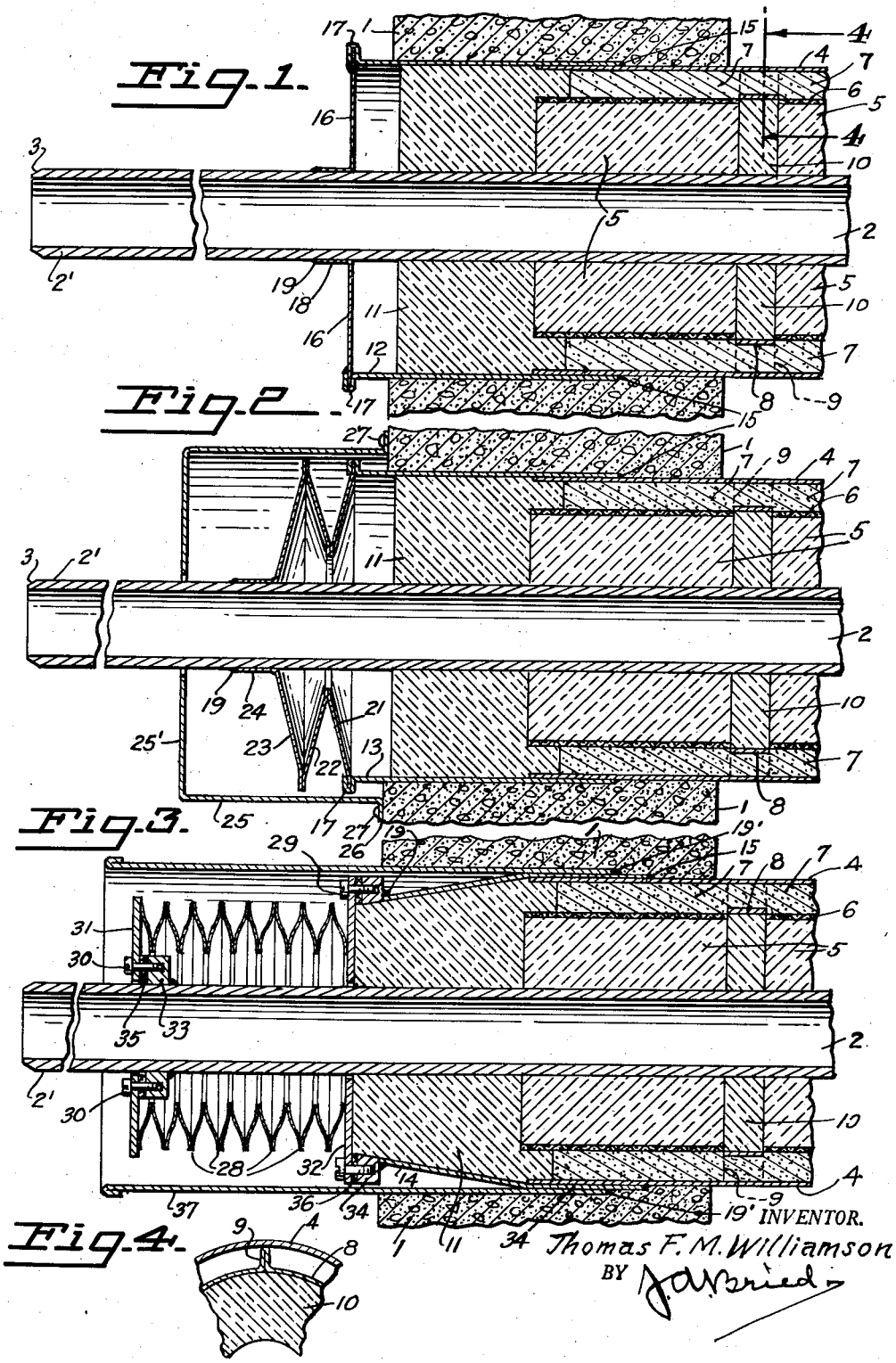

2,478,552

UNITED STATES PATENT OFFICE 2,478,552

INSULATED PIPE TERMINAL

Thomas F. M. Williamson, San Francisco, Calif., assignor to Alexander H. Isenberg, Woodside, Calif.

Application December 8, 1945, Serial No. 633,812

5 Claims. (Cl. 138—47)

1

This invention relates to encased thermally insulated pipe such as used for steam, hot water, or other hot fluids, or cold gases or fluids, wherein the expansion and contraction of the encased pipes, especially in long runs, requires the use of expansion joints or special construction at one or both ends of the run of encased pipe.

The principal object of the invention is to provide for linear expansion of such insulated pipe ends or terminals in buildings or manholes while sealing the pipe run against the ingress of water or moist vapors to the thermal insulation. Other features and advantages of the invention will appear in the following description and in the accompanying drawings.

In the drawings—

Fig. 1 is a longitudinal cross section of a thermally insulated encased pipe terminal or end projecting through a concrete wall and equipped with a sealed flexible diaphragm member to permit elongation and contraction of the inner pipe which conveys the fluid.

Fig. 2 shows a modification of the construction of Fig. 1 using three flexible diaphragms in the form of a short bellows.

Fig. 3 shows a construction substantially like that of Fig. 2 but showing a longer sealing bellows, and also one which is separable from the pipe and/or its casing.

Fig. 4 is a fragmentary cross section taken along the line 4—4 of Fig. 1 showing one form of spacing spider for maintaining the central thermally insulated pipe concentric within the outer casing to receive the asphalt or tar filling.

In further detail, 1 is a concrete wall as of a manhole or building wall through which the pipe 2 is to pass from a run to a final inner end 2' within the manhole or basement of a building, and where the extreme end of the pipe is beveled off as at 3, or threaded, for welding or otherwise suitably connecting to any desired device or sliding stuffing box member not shown.

Pipe 2 is generally of metal and is shown concentrically disposed within an outer casing 4 which is preferably of galvanized sheet metal of several times the diameter of the pipe 2, and the latter is shown entirely surrounded with a thick layer of any approved type of thermal insulation, preferably such as the conventional magnesia steam pipe block insulation 5 which is fitted around the pipe in the well known way and preferably wrapped with one or more layers of cloth 6 as well understood, while between this insulation and the inner surface of the casing 4 is a solid filling of asphalt, tar, or pitch 7 preferably

2 poured in in molten form and allowed to solidify to form a waterproofing envelope or seal against water or moisture from the exterior gaining access to the thermal insulation.

To insure a firm support for the pipe within the casing any form of supporting spacers may be used between the insulation 5 and the interior of the casing, as is all well known construction, tho I prefer to use a sheet metal spacing ring 8 or band formed at intervals with radially extending legs 9 to touch the inner surface of the casing, and while such bands may be used at intervals embracing the insulation 5, I prefer to mount each spacer band in tightly embracing relation to a preformed collar 10 of relatively firm thermal insulating material which may be slipped over the pipe 2 occasionally at the ends of the magnesia pipe covering sections.

Preferably the block insulation 5 terminates a short distance within the end of the casing 4 and the asphalt 7 terminates at about the same place or somewhat short of the insulation 5 as shown in the drawings, and outward of this is a thick filling of a thermal insulation 11 packed in loose or preferably in paste form to harden, and which covers the ends of the asphalt layer 7 as well as the end of the steam pipe covering 5.

Before putting in this end covering insulation 11, a sheet metal tube (12 in Fig. 1, 13 in Fig. 2, and 14 in Fig. 3) is fitted telescopically over the end of the casing 4 and welded, brazed or soldered thereto to make a sealed joint therewith, as indicated at 15, and with the end of this tube projecting outwardly beyond the end of the casing 4 to form substantially an integral extension of the casing beyond the insulation, and which it may actually be if desired.

In Fig. 1, the projecting end of the tube 12 is closed by a flexible diaphragm 16 preferably of thin sheet metal, and crimped and soldered, brazed or welded around its margin to form a hermetically sealed joint 17 with the tube, while adjacent the center of the diaphragm is a hub or flange 18 welded or otherwise hermetically sealed to the pipe 2 as at 19. This flange 18 may be integrally formed with or suitably secured to the diaphragm.

The concrete wall 1, or at least the portion of it through which the casing extends, is cast in place around the assemblage substantially as shown in the drawings and holds the casing rigid, while the pipe 2 is free to expand and contract linearly through its thermal insulation while flexing the diaphragm 16 which maintains the entire inner area between the pipe and casings hermetically sealed against any water or moisture gaining access thereto from the basement or manhole end, while the tube 12 being autogenously sealed at its end to the casing likewise prevents any water getting through from the outer wall side or through the concrete, tho of course it is presumed the concrete is also made as watertight as practicable and usually outside tarred as well when possible.

In the variation shown in Fig. 2 the single diaphragm of Fig. 1 is replaced with three annular metal diaphragms 21, 22, 23 arranged in the form of a bellows and with the periphery of 21 secured to the tube 13 and central flange 24 of 23 secured to the pipe, in the manner as described for Fig. 1 and numbered as at 17 and 19, it being understood that the meeting margins of the bellows members are similarly hermetically united. In this showing a removable protector tube or shell-like housing 25 surrounds the bellows and is provided with a flange 26 at one end secured to the concrete wall as by studs 27 and is provided with a closed outer end 25′ through which the pipe 2 may freely slide.

In the variation shown in Fig. 3 the parts are all as described for Fig. 2 except that the metal bellows (indicated in Fig. 3) as 28 is shown with quite a number of folds and is detachably secured at one end to the casing structure as by bolts 29 and detachably secured at its other end to the pipe 2 as by bolts 30.

In this construction the opposite ends of the flexible bellows are respectively soldered or welded to relatively thick disks 31, 32 which are secured by the bolts mentioned to flanges 33, 34 respectively welded to pipe 2 and tube 14. In this construction tube 14 is shown conical for part of its length and to the outer end of which flange 34 is welded as at 19. Suitable gasket rings, 35 and 36, preferably of copper or soft metal, or of the type used in automobile engine heads, are interposed between the disks 31 and 32 and their bolting flanges. A covering housing 37 similar to that shown at 25 in Fig. 2, surrounds the bellows, but instead of being secured to the concrete wall, is extended over the tube 14 and welded thereto as at 19′.

While the structure of Fig. 3 provides for a sliding bellows which may be applied or removed after the pipe terminal has been installed, it is manifest that the gasket joints may be permanently welded if desired.

In use of the structures above described it is manifest that since the expansion and contraction effect depends on the length of the pipe runs, as well as the degree of temperature changes to which the pipe is subjected, that the most suitable arrangement shown in the drawings should be used to meet the requirements, and that while in most installations one end of the run may be anchored or fixed, yet in some cases both ends of a run may be equipped with the improvement shown herein.

In my appended claims the words "diaphragm device" or diaphragm means are intended to include the single form of diaphragm shown in Fig. 1 as well as the multiple form of Figs. 2 and 3. Also the word "welded" where used, is intended to include soldering, brazing, or autogenous sealing of any kind.

I claim:

1. In combination with an externally thermally insulated pipe spacedly surrounded by a tubular metal casing with the space filled with sealing pitch and with the pipe projecting out of one end of the casing, flexible diaphragm means through which the pipe extends, and means forming a sealed joint between the outer margin of said flexible diaphragm means and said metal casing, means forming a sealed joint between the pipe and said diaphragm means, and a wall through which said casing extends and is locked against movement, and a housing extending from said wall surrounding said diaphragm means.

2. In a structure as set out in claim 1 said diaphragm means being in the form of a metal bellows welded to said casing and to said pipe.

3. In combination with an insulated pipe comprising a pipe with a covering of heat insulation, a layer of waterproofing surrounding the heat insulation, and a tubular casing enclosing the waterproofing, a closure of heat insulation at the end of the casing covering the end of the layer of waterproofing, said pipe extending out beyond said closure and casing, and a flexible diaphragm device sealed at its outer margin with said casing, and said pipe passing through said diaphragm device and means sealing it thereto, all whereby said pipe may expand linearly relative to said casing with said diaphragm device maintaining the area between the casing and pipe hermetically sealed.

4. In the construction as set out in claim 3 there being a tubular extension section of said casing welded to the casing and to the outer end of which casing section said diaphragm device is sealed.

5. In the construction as set out in claim 3 there being a tubular extension section of said casing welded to the casing and to the outer end of which casing section said diaphragm device is sealed, and a housing for said diaphragm device surrounding the outer portion of the casing extension and said diaphragm device.

THOMAS F. M. WILLIAMSON.

REFERENCES CITED

The following references are of record in the file of this patent:

UNITED STATES PATENTS

| Number | Name | Date |
|---|---|---|
| 1,354,706 | Warriner | Oct. 5, 1920 |
| 1,792,855 | McRae | Feb. 17, 1931 |
| 1,992,612 | Hall | Feb. 26, 1935 |
| 2,348,833 | Miller | May 16, 1944 |

FOREIGN PATENTS

| Number | Country | Date |
|---|---|---|
| 831,980 | France | Sept. 16, 1938 |